United States Patent [19]

Kistler

[11] 4,335,985
[45] Jun. 22, 1982

[54] CONTROL APPARATUS FOR CONTROLLING A FEED MOVEMENT IN A GEAR CUTTING MACHINE

[75] Inventor: Viktor Kistler, Thalwil, Switzerland

[73] Assignee: Werkzeugmaschinenfabrik Oerlikon-Bührle AG, Zürich, Switzerland

[21] Appl. No.: 107,331

[22] Filed: Dec. 26, 1979

[30] Foreign Application Priority Data

Jan. 24, 1980 [CH] Switzerland .................. 704/79

[51] Int. Cl.³ .............................................. B23F 3/00
[52] U.S. Cl. ......................................... 409/3; 409/30
[58] Field of Search ................... 409/30, 19, 2, 3

[56] References Cited

U.S. PATENT DOCUMENTS 2,356,796 8/1944 Purvin ........................... 409/19 X
2,857,817 10/1958 Zimmermann et al. ........... 409/19
3,813,988 6/1974 Hodgson ............................ 409/3

Primary Examiner—Z. R. Bilinsky
Attorney, Agent, or Firm—Werner W. Kleeman

[57] ABSTRACT

A control apparatus for controlling a feed or advance movement of a tool relative to a workpiece in a gear cutting machine operating according to a continuous cutting process, comprising a drive for the tool and the workpiece and a hydraulic directional control valve having a slide or spool controlling the infeed of pressurized fluid medium to a feed piston. By means of the feed motion of the feed piston there is moved through a preparatory path which can be adjusted by a control cam carrier or support as well as a machining or processing path which is governed by the control cam.

In order to prevent, in the presence of false setting of the preparatory path, damage to the workpiece, tool and machine, there is provided a switch for turning-on and turning-off the drive of the tool and the workpiece and a pressure limiter which can be switched-off and switched-on during the time that there is moved through the machining path and preparatory path, respectively.

1 Claim, 4 Drawing Figures

CONTROL APPARATUS FOR CONTROLLING A FEED MOVEMENT IN A GEAR CUTTING MACHINE

BACKGROUND OF THE INVENTION

The present invention relates to a new and improved construction of a control apparatus for controlling a feed or advance movement of a tool relative to a workpiece in a gear cutting machine operating according to a continuous cutting process.

Generally speaking, the control apparatus of the present development is of the type comprising a drive for the tool and the workpiece and a hydraulic directional control valve containing a slide or spool which controls the infeed of pressurized fluid medium to a feed or advance piston. By means of the feed movement of the feed piston there is moved through a preparatory path which can be adjusted at a control cam carrier or support and also through a machining path which is governed by the control cam.

Control apparatuses for controlling the feed or advance motion of a tool in a gear cutting machine insure that the tool moves, throughout a preparatory path, relatively quickly, and then during a machining path, on the other hand, relatively slowly in the direction of the workpiece.

There are known to the art control equipment of the type generally discussed above, wherein the length of the preparatory path must be adjusted. This adjustment or setting must be undertaken each time for each newly employed tool or workpiece and is dependent upon the spacing between the tool and the workpiece in a starting position. This setting is accomplished at the control apparatus in that, in the starting position this spacing also is adjusted between a control cam and a feeler or follower roll.

Now if for some reason this spacing between the tool and the workpiece has been incorrectly set at the control apparatus, then considerable damage can arise at the gear cutting machine and also at the tool and the workpiece, in that the rotating tool still penetrates into the likewise rotating workpiece during the preparatory path. This in turn causes intensive pressure increases in the hydraulically operating portion of the control equipment. The resultant high forces between the tool and the workpiece lead to its damage or destruction, as the case may be. Additionally, damage to the bearings and guides of the movable parts of the machine is equally possible, and the elimination thereof is extremely costly.

SUMMARY OF THE INVENTION

Therefore, with the foregoing in mind it is a primary object of the present invention to provide a new and improved construction of control apparatus for controlling a feed or advance movement in a gear cutting machine in a manner not afflicted with the aforementioned drawbacks and limitations of the prior art proposals.

Another and more specific object of the present invention aims at avoiding damage to the workpiece, tool and machine, which could arise during the input of too long a preparatory path into the control apparatus.

A further significant object of the present invention aims at providing a new and improved construction of control apparatus for controlling the feed movement in a gear cutting machine in an extremely reliable, efficient and accurate manner, while avoiding the drawbacks of the prior art systems noted above, and wherein such control apparatus is relatively simple in construction and design, economical to manufacture, extremely reliable in operation, and not readily subject to breakdown or malfunction.

Now in order to implement these and still further objects of the invention, which will become more readily apparent as the description proceeds, the control apparatus of the present development is manifested by the features that there is provided a switch, activated by the slide or spool of the directional control valve, this switch serving for turning-on and turning-off the drive of the tool and the workpiece. Further, there is provided a pressure limiter which can be switched-on and switched-off during such time as the tool or the workpiece pass through the machining path and the preparatory path, respectively.

The advantage of the inventive solution resides in the fact that the drive for the tool and the workpiece, upon contact of the tool at the workpiece, remains turned-off if there has been set at the control apparatus too long a preparatory path. Consequently, this contact between the tool and the workpiece is accomplished with smaller force.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
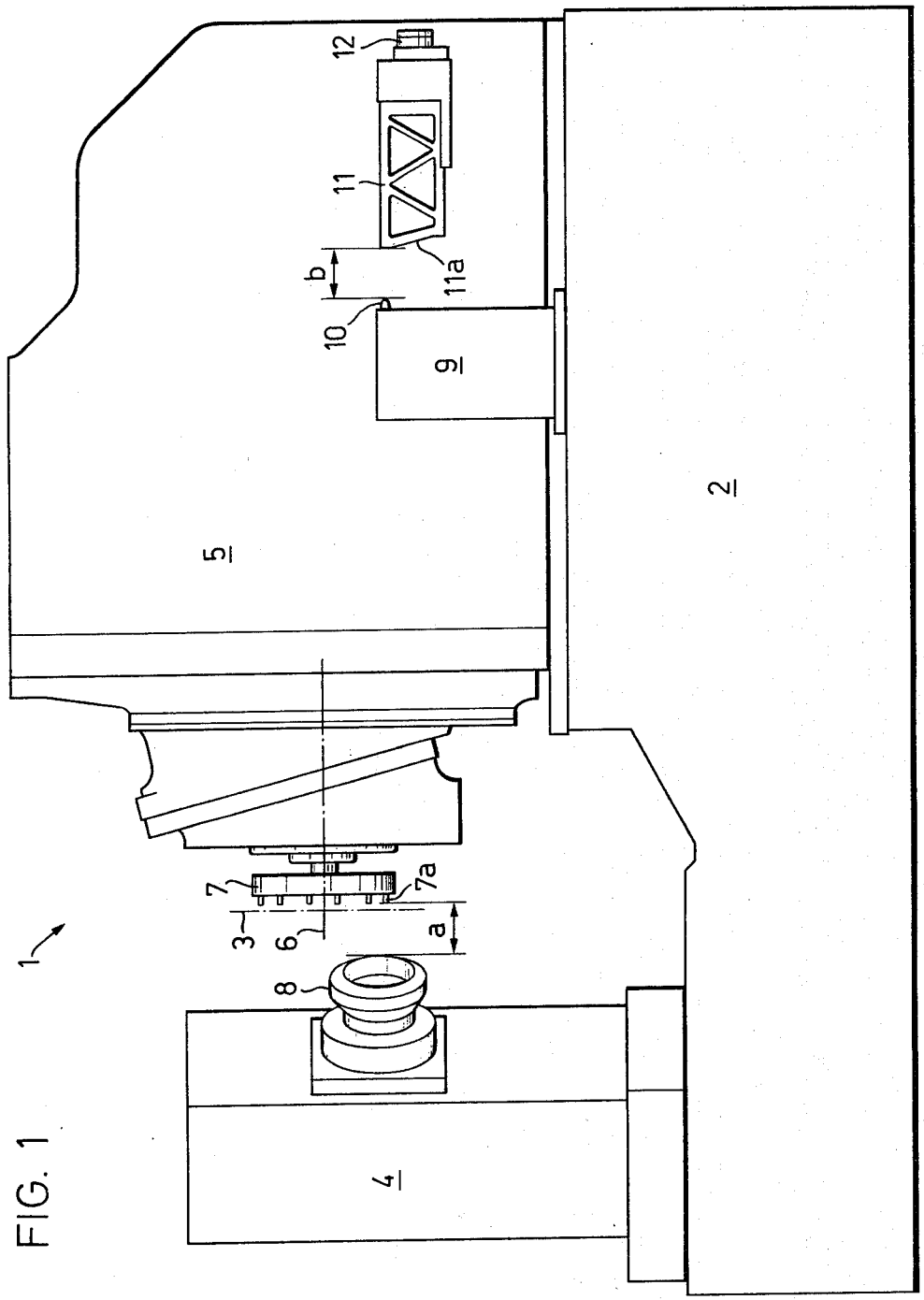
FIG. 1 is a side view of a gear cutting machine.

Describing now the drawings, it is to be understood that only enough of the construction of the gear cutting machine with which the control apparatus of the invention is contemplated to be used by way of example, has been shown in the drawings to enable those skilled in the art to readily understand the underlying principles and concepts of the instant invention. Turning attention then specifically to FIG. 1, there will be recognized therein a conventional gear cutting machine 1 containing a machine bed 2, a headstock 4 pivotable about a vertical axis and a rolling or generating cradle 5. Such is displaceably mounted upon the machine bed 2 in the direction of a horizontal axis 6. A tool 7 is rotatably mounted in the rolling or generating cradle 5. In this example the tool 7 may be considered to be a cutter head which is equipped with a number of cutter blades 7a. In the headstock 4 the workpiece 8 is likewise rotatably mounted and, in the embodiment under discussion, consists of a bevel gear blank at which there are to be cut gear teeth. Such type gear cutting machines, as mentioned, are known, and without in any way limiting the field of application of the control apparatus of this development mention is made of the commonly assigned U.S. Pat. No. 4,090,428, granted May 23, 1978, showing such type gear cutting machine of the prior art.

Apart from the generating or rolling cradle 5 there is arranged upon the machine bed 2 an upright or column member 9 from which protrudes a feeler roll or follower 10. A control cam carrier or support 11 containing a control cam 11a or equivalent structure is horizontally displaceably arranged at the rolling cradle 5 by means of the hand wheel 12 or the like, and additionally is vertically displaceably arranged, for instance in suitable guides.

Figure 2:
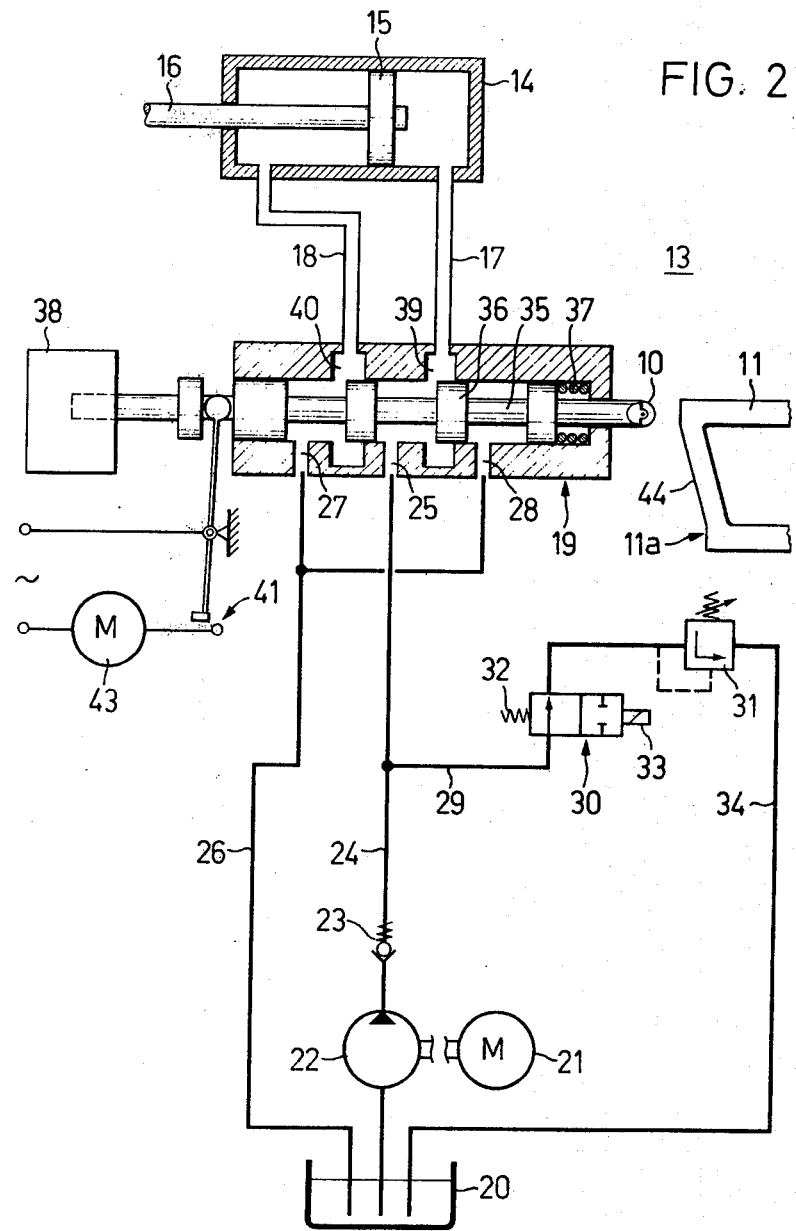
FIG. 2 illustrates an inventive control apparatus of the gear cutting machine in schematic illustration for one operating state or condition.

Continuing, in FIG. 2 there will be recognized a control apparatus 13 which controls the motion of a feed or advance piston 15. This piston 15 is movable to-and-fro within a cylinder 14, which in any suitable manner is attached at the machine bed 2. A piston rod 16 connects the feed or advance piston 15 with the rolling cradle 5. Two lines or conduits 17 and 18 connect the cylinder 14 and a directional control valve or selector spool valve 19. This directional control selector spool valve 19 controls pressurized fluid medium flowing through the lines or conduits 17 and 18. This pressurized fluid medium is delivered from a container or reservoir 20 by means of a pump 22 driven by a suitable drive motor 21, a check valve 23 and line 24 to the inlet 25 of the selector spool valve 19. A line or conduit 26 connects the outlets 27 and 28 of the selector spool valve 19 with the container or reservoir 20. A branch line or conduit 29 connects the line 24 by means of a directional control valve 30 with a pressure limiter 31. The directional control valve 30 is retained by a spring 32 or a magnet 33 in desired position. The line 34 connects the pressure limiter or pressure limiter means 31 with the container 20.

The selector spool valve 19 contains a slide or spool 35 carrying a number of pistons 36 and is moved by the action of a spring 37 in the one direction and by the action of a magnet 38 in the other direction. Pistons 36 of the spool 35 can block or release, as required, the outlets 39 and 40 of the selector spool valve 19. If the spool or slide 35 is shifted towards the left, by the spring 37, out of a central position according to the showing of FIG. 3, then the inlet 25 flow communicates with the outlet 40 and the outlet 39 flow communicates with the outlet 28. If, however, the spool 35 is shifted by the magnet 38 or equivalent structure towards the right of the showing of FIG. 2, then the inlet 25 is in flow communication with the outlet 39 and the outlet 40 is in flow communication with the outlet 27. The end of the spool 35, facing away from the actuation magnet 38, carries the feeler roll or follower 10 serving to scan the control cam 11a. By means of the spool or slide 35 there is additionally activated an electric switch 41. This electric swtich 41 opens or closes the current circuit of a drive 43, for instance an electric motor for the tool 7 and the workpiece 8.

Having now had the benefit of the foregoing description of the construction of the control apparatus and the machine tool there will now be described its mode of operation which is as follows:

In a starting position the rolling cradle 5 is located in the position shown in FIG. 1. The horizontal spacing a between the tool 7 and the workpiece 8 is also set as the spacing b, by rotating the hand wheel 12 or the like, between the follower or feeler roll 10 and the control cam 11a. The control cam support 11 is located in its lower end position according to the showing of FIGS. 1 and 2. In the control apparatus 13 pressurized fluid medium is conducted from the container or reservoir 20, by the action of the pump 22 driven by the drive motor 21, the check or non-return valve 23, the line 24, the branch line 29, the directional control valve 30 and the pressure limiter 31 and again refed back into the container 20. Hence, with the electromagnet or magnet means 33 deenergized, the directional control valve 30 is in the position shown in FIG. 2.

Figure 3:
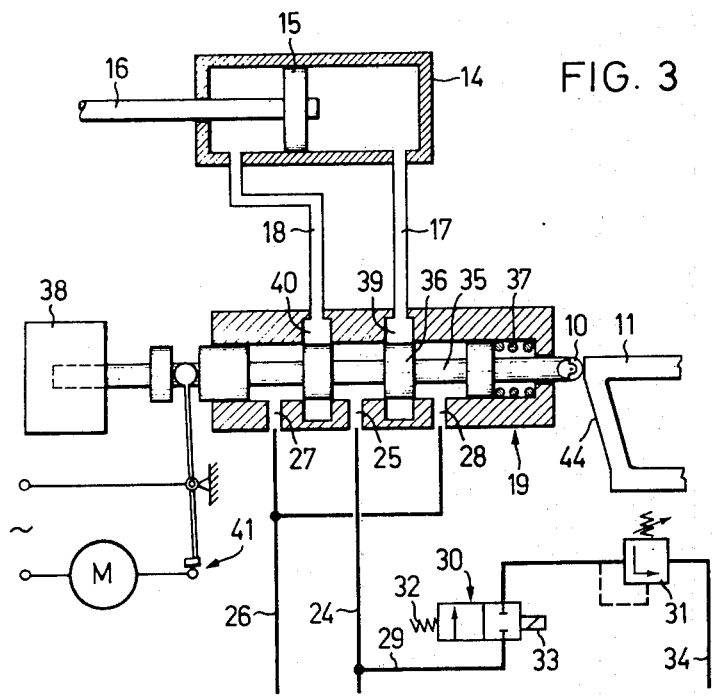

Due to switching-on the electromagnet 38 the spool or slide 35, as apparent from the showing of FIG. 2, is shifted towards the right. Since the pistons 36 free the outlets 39 and 40, the pressurized fluid medium can flow out of the line 24 into the line 17, and thus, can impinge the right-hand face of the piston 15 within the cylinder 14. At the left face of the piston 15 pressurized fluid medium flows by means of the line 18, the outlets 40 and 27 and the line 26 back into the container or reservoir 20. Consequently, the piston 15 and thus the rolling cradle 5 is moved towards the left towards the workpiece 8. The pressure limiter means 31 has been adjusted or set such that the pressure in the control apparatus 13, and therefore, also within the cylinder 14 is just adequate in order to move the rolling cradle 5. Due to the movement of the rolling cradle 5 towards the headstock 4 the control cam 11a approaches the feeler roll or follower 10. Once the control cam 11a has reached the follower or feeler roll 10, then the latter and therefore the slide or spool 35 together with the piston 36 shifts towards the left. Once the spool 35 has reached that position, as shown in FIG. 3, where the pistons 36 close both of the outlets 39 and 40, then the tool 7 has moved through the preparatory path, sometimes also referable to as the preparatory displacement path. The piston 15 is no longer able to move, since the lines or conduits 17 and 18 are closed. Hence, the rolling cradle 5 is now brought to standstill and the control cam 11a cannot further move the spool 35, because it is connected with the rolling cradle 5, and thus, with the feed or advance piston 15.

Shortly prior to reaching the spool position shown in FIG. 3, the switch 41 closes the current circuit, and thus, the drive or drive means 43 for the tool 7 is switched-on. In the spool position according to FIG. 3 there is also activated in any suitable fashion the electromagnet 33, so that the directional control valve 30 switches, and thus, blocks the line or conduit 29. Now a higher pressure builds-up in the control apparatus 13, since the pressure limiter 31 is ineffectual. At the same time the control cam support or carrier 11 together with the control can 11a begins to slowly move upwardly at the rolling cradle 5. As soon as the control cam 11a has moved upwardly to such an extent that the feeler roll or follower 10 rides against an inclined surface 44, then the spool 35, under the action of the electromagnet 38, can shift in opposition to the spring 37 towards the right, as apparent from the showing of FIG. 4. Hence, it is again possible for the pressurized fluid medium to flow out of the line 24 by means of the inlet 25, the outlet 39 and the line 17 to the one side or face of the piston 15 within the cylinder 14. On the other hand, pressurized fluid medium also moves from the other side or face of the piston 15 out of the cylinder 14, through the line 18, the outlets 40 and 27 and via the line 26 into the container or reservoir 20. Hence, the tool 7 can now move through the machining path, also sometimes referred to as the machining displacement path, and begins to machine the workpiece 8, and for this purpose there is also needed the above-mentioned higher pressure in the control system or apparatus 13 for the feed or advance of the rolling cradle 5.

Figure 4:
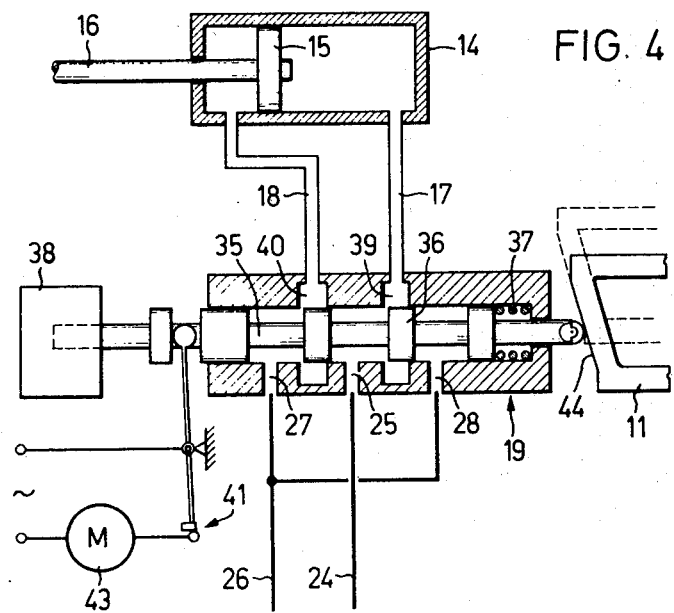
FIGS. 3 and 4 respectively show further operating states of the control apparatus of FIG. 2.

A comparison of FIGS. 2 and 4 will reveal that during such time as the tool 7 has moved through the machining path, as shown in FIG. 4, the piston 36 only maintains open a small passageway for the pressurized fluid medium and the current circuit is retained closed by the switch 41. The slope or inclination of the surface 44 of the control cam 11a, the velocity of the upward motion of the control cam 11a, and the feed or advance velocity of the rolling cradle 5 influenced by both of these magnitudes, are coordinated to one another such that there results a low feed or advance velocity.

If the spacing a between the tool 7 and the workpiece 8 is smaller than the spacing b between the follower 10 and the control cam 11a, then during the feed or advance motion of the tool 7 the latter reaches the workpiece 8 before it has moved through the preparatory path. The rolling cradle 5 and accordingly the piston 15 are stopped due to contact of the workpiece 8 and the tool 7. Since the entire control apparatus 13 works at low, limited pressure, this does not cause any damage to the tool 7 or workpiece 8. The drive or drive means 43 for the tool 7 and the workpiece 8 is not turned-on, since the spool 35 has not been shifted towards the left by the control cam 11a and remains in its position as shown in FIG. 2.

After the control cam 11a has reached its upper end or terminal position, shown in FIG. 4 in broken lines, then the feed movement has been completed. The electromagnet 38 now is turned-off and the spool 35 is brought into a position, by the action of the spring 37, where pressurized fluid medium flows out of the line 24 by means of the inlet 25, to the outlet 40 and the line 18 into the cylinder 14. The piston 15 and thus also the rolling cradle 5 now begins to perform its return stroke and the displaced pressurized fluid medium arrives, by means of the line 17, the outlets 39 and 28 as well as the line 26, at the container or reservoir.

Of course, the inventive pressure limiter 31 also can be differently constructed, for instance as a two-wave valve or opened-closed valve actuated by a pressure switch. A further possibility is for the pressure limiter to be structured as a pressure switch, which upon reaching a certain pressure in the control apparatus deenergizes the electromagnet 38, with the result that the spool 35 is shifted towards the left by the spring 37, and the piston 15 is moved in the opposite direction. Of course the spool or slide 35, instead of being displaced by the electromagnet 38, also can be shifted by a piston under the influence of pressurized oil against the spring 37.

While there are shown and described present preferred embodiments of the invention, it is to be distinctly understood that the invention is not limited thereto, but may be otherwise variously embodied and practiced within the scope of the following claims. Accordingly,

What I claim is:

1. A control apparatus for controlling a feed movement of a tool relative to a workpiece in a gear cutting machine working according to a continuous cutting process, comprising:
    drive means for driving the tool and the workpiece;
    a hydraulic selector spool valve containing a displaceable spool;
    a cylinder;
    a machine bed;
    said hydraulic selector spool valve and said cylinder being mounted at said machine bed;
    a feed piston arranged for to-and-fro movement within said cylinder;
    a rolling cradle;
    said feed piston being operatively connected to said rolling cradle;
    means for displacing said spool;
    said spool controlling the infeed of pressurized fluid medium to said feed piston;
    said feed piston moving through a preparatory path and machining path, respectively, so that by means of the feed movement of the feed piston there can be accomplished movement through the preparatory path and machining path;
    a control cam support displaceably arranged at the rolling cradle;
    a control cam carried by said control cam support;
    said control cam support regulating the preparatory path and said control cam governing said machining path of the feed piston;
    switch means actuated by said spool for turning-off said drive means during the preparatory path and for turning-on said drive means during the machining path; and
    pressure limiter means which is turned-on during the preparatory path and which is turned-off during the machining path.

* * * * *

UNITED STATES PATENT AND TRADEMARK OFFICE
CERTIFICATE OF CORRECTION

PATENT NO. : 4,335,985
DATED : June 22, 1982
INVENTOR(S) : VIKTOR KISTLER

It is certified that error appears in the above-identified patent and that said Letters Patent are hereby corrected as shown below:

On the Title Page, item [30], line 2, delete the date "Jan. 24 1980" and insert --Jan. 24, 1979--

Column 4, line 46, change "can 11a" to read -cam 11a--.

*Signed and Sealed this*

*Second* Day of *November 1982*

[SEAL]

Attest:

GERALD J. MOSSINGHOFF

*Attesting Officer*     *Commissioner of Patents and Trademarks*